(12) United States Patent
McVey et al.

(10) Patent No.: US 12,547,315 B1
(45) Date of Patent: Feb. 10, 2026

(54) ZERO MEMORY BUFFER COPYING IN A RELIABLE DISTRIBUTED COMPUTING SYSTEM

(71) Applicant: Scale Computing, Inc., Austin, TX (US)

(72) Inventors: Clint McVey, San Carlos, CA (US); Scott Loughmiller, San Francisco, CA (US)

(73) Assignee: Scale Computing, Inc., Austin, TX (US)

( * ) Notice: Subject to any disclaimer, the term of this patent is extended or adjusted under 35 U.S.C. 154(b) by 196 days.

(21) Appl. No.: 17/507,792

(22) Filed: Oct. 21, 2021

Related U.S. Application Data

(63) Continuation of application No. 16/118,422, filed on Aug. 30, 2018, now Pat. No. 11,169,708, which is a continuation of application No. 14/554,012, filed on Nov. 25, 2014, now Pat. No. 10,089,011.

(51) Int. Cl.
| | |
|---|---|
| *G06F 3/06* | (2006.01) |
| *G06F 9/455* | (2018.01) |
| *H04L 67/10* | (2022.01) |
| *H04L 67/1097* | (2022.01) |

(52) U.S. Cl.
CPC .......... *G06F 3/061* (2013.01); *G06F 3/0608* (2013.01); *G06F 3/0631* (2013.01); *G06F 3/0659* (2013.01); *G06F 3/0683* (2013.01); *G06F 9/45533* (2013.01); *H04L 67/1097* (2013.01); *G06F 3/0664* (2013.01); *H04L 67/10* (2013.01)

(58) Field of Classification Search
CPC ...... G06F 3/061; G06F 3/0608; G06F 3/0631; G06F 3/0659; G06F 3/0683; G06F 9/45533; G06F 3/0664; H04L 67/1097; H04L 67/10
USPC ........................................................ 709/217
See application file for complete search history.

(56) References Cited

U.S. PATENT DOCUMENTS

| 8,499,114 | B1* | 7/2013 | Vincent ..................... G06F 8/65 711/6 |
| 9,009,437 | B1* | 4/2015 | Bjornsson ............. G06F 3/0641 718/1 |
| 2007/0061492 | A1* | 3/2007 | van Riel ................. H04L 69/22 710/3 |
| 2008/0320316 | A1* | 12/2008 | Waldspurger ......... H04L 63/083 713/189 |
| 2009/0183180 | A1* | 7/2009 | Nelson .................. G06F 9/4812 718/1 |

(Continued)

*Primary Examiner* — Nicholas R Taylor
*Assistant Examiner* — Chong G Kim
(74) *Attorney, Agent, or Firm* — Kowert, Hood, Munyon, Rankin & Goetzel, P.C.; Jeffrey C. Hood; Matthew C. Washburn

(57) ABSTRACT

Reducing buffer space that is reserved when a VM attempts to write to disk. A shared memory maintains stored information available to all VM's, allowing translation between accessible to RSD's, independent of how that VM's storage is divided into VSD's. When a guest OS writes to a VSD, an "extent", designating a location in the shared memory and amount of data to be transferred, which can be passed directly from the guest OS, through each element involved in translating the operation into one or more operations on RSD's, keeping copying to a minimum. No substantial changes need be made to the guest OS.

13 Claims, 2 Drawing Sheets

(56) References Cited

U.S. PATENT DOCUMENTS

| | | | |
|---|---|---|---|
| 2010/0228934 A1* | 9/2010 | Chandrasekaran | G06F 9/45558 718/1 |
| 2011/0126195 A1* | 5/2011 | Tsirkin | G06F 9/544 718/1 |
| 2012/0166738 A1* | 6/2012 | Gower | G06F 9/547 711/E12.001 |
| 2013/0191924 A1* | 7/2013 | Tedesco | G06F 21/74 726/26 |
| 2014/0075127 A1* | 3/2014 | Garthwaite | G06F 12/08 711/147 |
| 2014/0281115 A1* | 9/2014 | Biswal | G06F 12/1009 711/3 |
| 2015/0220354 A1* | 8/2015 | Nair | C07K 16/2887 710/308 |
| 2015/0277789 A1* | 10/2015 | White | G06F 3/067 711/114 |
| 2019/0268766 A1* | 8/2019 | Luft | H04W 76/14 |

* cited by examiner

Method 200

ZERO MEMORY BUFFER COPYING IN A RELIABLE DISTRIBUTED COMPUTING SYSTEM

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Pagel and Nate Hardt, titled "Resource management in a virtual machine cluster".

Application 61/909,336, filed Nov. 26, 2013, in the name of Aaron Pagel and Nate Hardt, titled "Resource management in a virtual machine cluster".

Application 61/909,342, filed Nov. 26, 2013, in the name of Aaron Pagel and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. 62/123,740, filed Nov. 25, 2014, in the name of Scott Loughmiller, Philip White, Aaron Pagel, Nate Hardt, and Clint McVey, titled "Reliable Independent Block Engine and State Machine".

Each and every one of these documents, as well as all documents cited therein, are hereby incorporated by reference as if fully recited herein.

This application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

RELATED APPLICATIONS

This Application describes technologies that can be used with inventions, and other technologies, described in one or more of the following Applications, each assigned to the same assignee:

U.S. Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage".

U.S. application Ser. No. 14/229,748, filed Mar. 28, 2014, in the name of inventors Philip White, and Hank Hsien, titled "Placement engine for a block device".

U.S. application Ser. No. 14/318,414, filed Jun. 27, 2014, in the name of inventors Philip White, titled "Shared reference counters among a plurality of virtual storage devices".

U.S. application Ser. No. 14/320,427, filed Jun. 30, 2014, in the name of inventors Philip White, titled "Efficient migration of virtual storage devices to a remote node using snapshots".

Each and every one of these documents, as well as all documents cited therein, are hereby incorporated by reference as if fully recited herein.

This application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Field of the Disclosure

This application generally relates to memory buffers, distributed computing systems, reliable computing systems, and other matters.

Background of the Disclosure

Some computing systems are capable of emulating selected hardware devices, which might or might not be physically present at the computing system. These systems are sometimes called "virtual machines" ("VM's"), in which the code being executed to allocate and control physical resources is sometimes called the "host operating system" ("host OS"), and in which the code being executed to allocate and control emulated resources is sometimes called the "guest operating system" ("guest OS"). For example, it might occur that the host OS has a number of available storage elements, such as disk drives, and one or more guest OS's each have one or more partitions (or other portions) of those storage elements made available thereto.

For example, it might occur that the computing system maintains a distributed file system, with the idea that a distributed file system might be less subject to failure and more resilient to error. Each guest OS might read/write frequently from/to a virtual storage disk. However, allowing a guest OS to write directly to a real storage disk might be unsafe, as there is no assurance that the guest OS will properly maintain the reliability of the distributed computing system. It sometimes occurs that the reliable distributed computing system would allow the guest OS to instead write directly to a virtual storage disk, with a hypervisor translating that operation into one that applies to a real storage disk.

However, this can result in the same data being maintained in multiple buffers, particularly when the call chain between the guest OS and the actual hardware is relatively long.

Each of these issues, as well as other possible considerations, might cause difficulty in aspects of operating computing systems, particularly those computing systems in which virtual machines are implemented, or computing systems making use of distributed resources.

BRIEF SUMMARY OF THE DISCLOSURE

This application provides apparatuses and techniques that can reduce the amount of buffer space that is reserved when a virtual machine (VM) attempts to write to disk. A shared memory, accessible to a real storage device (RSD), maintains stored information available to all VM's, regardless of how that VM's storage is divided into virtual storage devices (VSD's). When a guest OS attempts to write to a VSD, an "extent", designating a location in the shared memory and a length of the data to be transferred, can be passed directly from the guest OS, through each software element involved in translating the guest OS's write operation into one or more operations on RSD's, keeping any copying of the data to a minimum. No substantial changes need be made to the guest OS, but relatively substantial savings can be had with respect to relative minimization of copying of buffers, and with respect to relative minimization of reserving buffer space while the operation is proceeding.

In one embodiment, a host OS (supervising the guest OS), or a hypervisor supervising the one or more host OS's, can obtain the block of data to be transferred, in a write operation (or the space for a block of data to be transferred, in a read operation), from an application being executed by the VM. The block of data can be maintained in the shared memory. The block of data can be referred to by a pointer in the guest OS. The pointer can be different for each guest OS without interfering with the operations described herein. An "extent" can be generated that identifies the block of data in the shared memory, and is not dependent on the nature of the pointer used by the guest OS. For example, the "extent" can represent a set of locations in an artificial namespace. The artificial namespace can be generated by an interprocess communication library, such as the "boost" C++ library operating within a Linux kernel.

In such embodiments, the instruction for the write operation can be received by a block driver element in the hypervisor (identified herein as "libscribe"). The libscribe element can communicate with a separate process (identified herein as the "scribed daemon"), that includes a server element (identified herein as the "libscribe server"). For example, the server element can communicate using a Unix socket communication technique, or using a client/server communication technique. The libscribe server can communicate with an I/O Manager, and the I/O Manager can communicate with the RSD's using a linux kernel asynchronous I/O interface. As the extent is maintained in the shared memory, the RSD can access the block of data directly, and can transfer the block of data using DMA. In each of these communications, the block of data can be transferred from one element to another by transferring only the extent; this allows only a single buffer to be allocated and held for the block of data, and allows the transfer of relatively large blocks of data in no more time than the transfer of relatively small blocks of data.

After reading this application, those skilled in the art would recognize that techniques shown in this application are applicable to more than just the specific embodiments shown herein. For a first example, the concept of buffers is intended to be broad, and can include linked lists, tree structures, and other data structures. For a second example, storage device could be replaced or augmented with any other device the system includes, including any device that can be coupled using an iSCSI interface, or otherwise.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

DETAILED DESCRIPTION

Terms and Phrases

The following definitions are intended to be exemplary and illustrative, not necessarily limiting:

The phrase "real storage device", the term "RSD", and variants thereof, generally refer to any physical device with which the computer system can communicate.

The phrase "virtual storage device", the term "VSD", and variants thereof, generally refer to any virtual device whose capabilities are emulated by a host operating system or virtual machine.

The term "extent", and variants thereof, generally refers to any designated set of locations in a memory accessible to both RSD's and VSD's.

FIGURES AND TEXT

Figure 1:
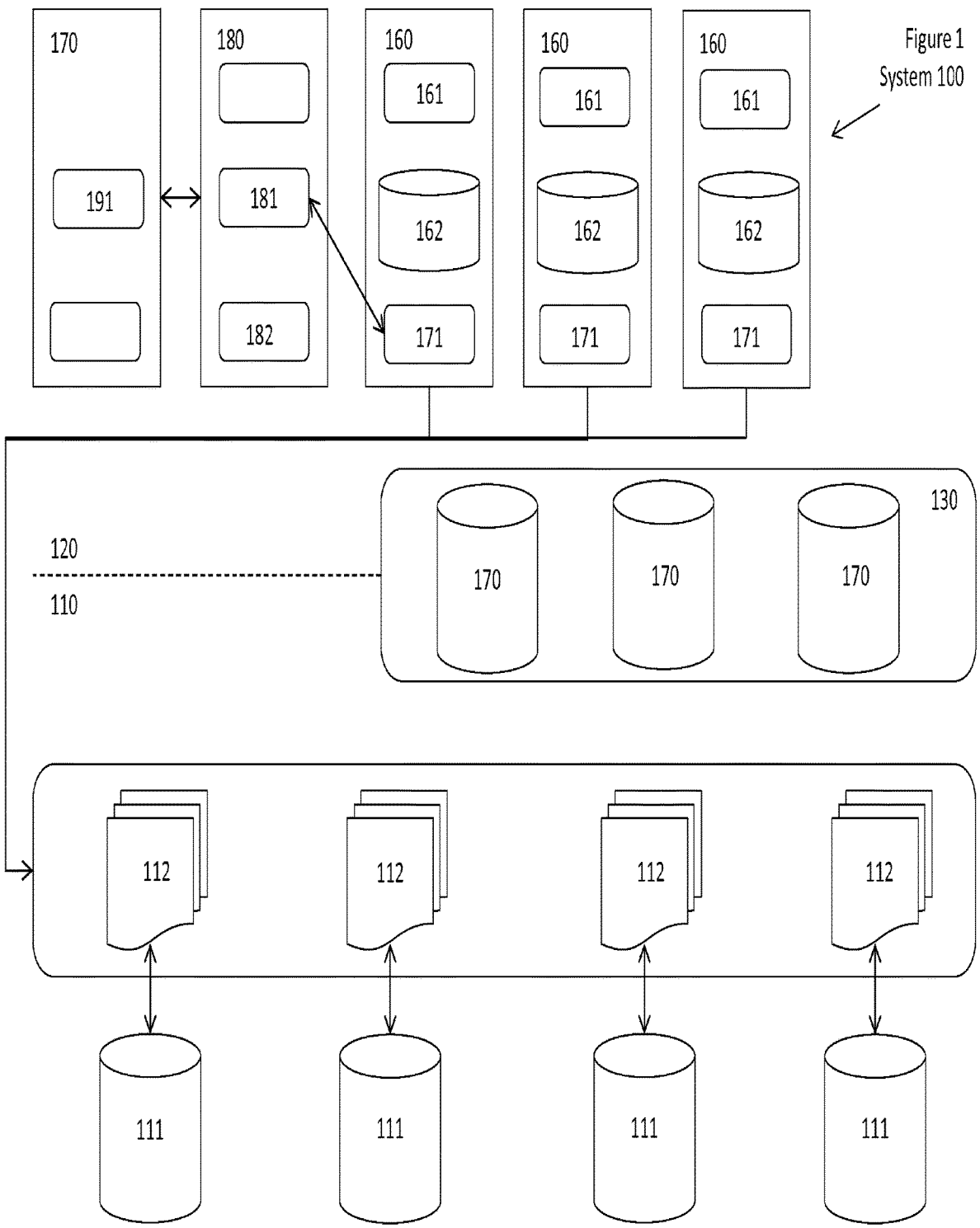
FIG. 1 shows a conceptual drawing of a system.
Figure 2:
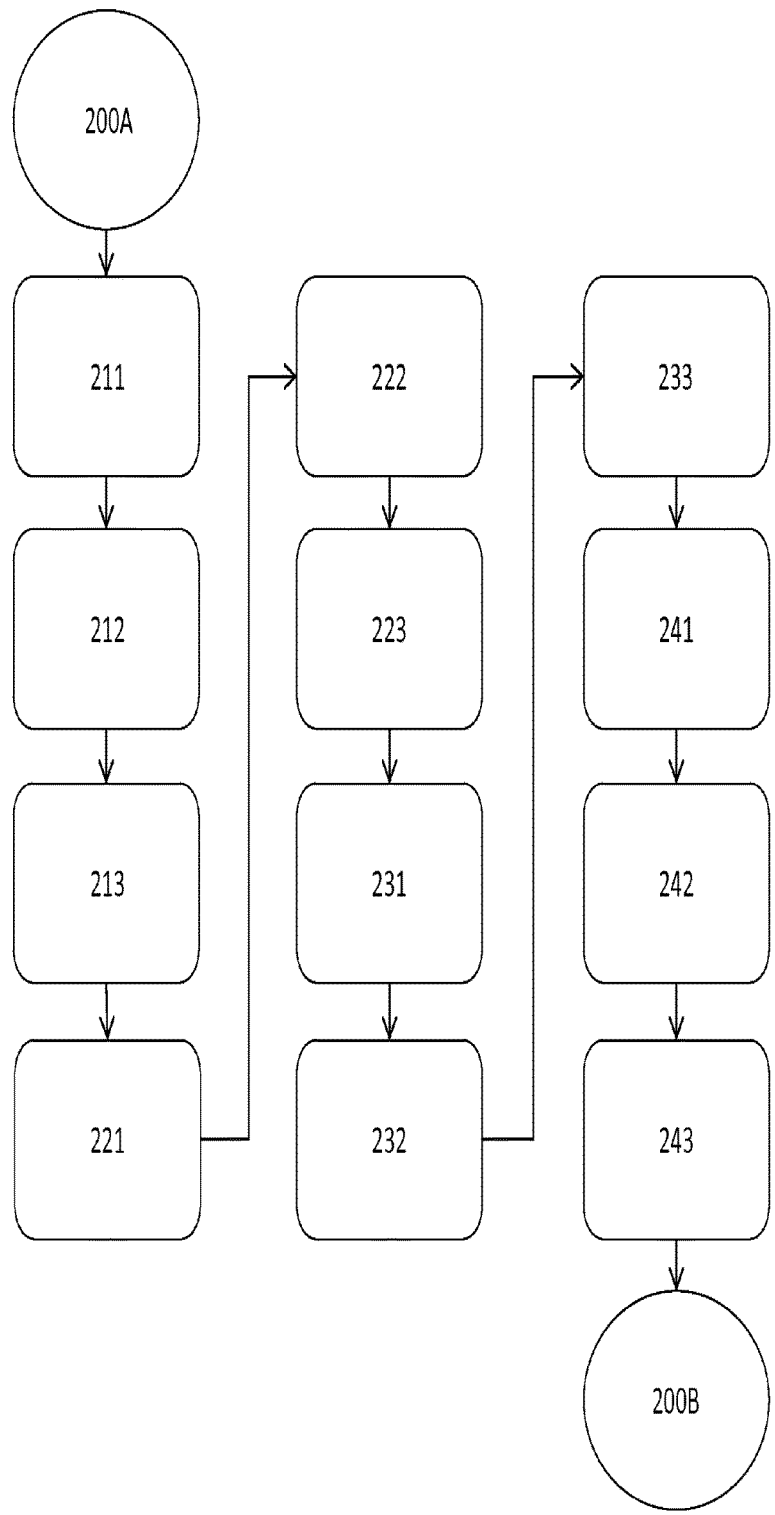
FIG. 2 shows a conceptual drawing of a method.

FIG. 1 shows a conceptual drawing of a system.
FIG. 2 shows a conceptual drawing of a method.

SYSTEM OVERVIEW

FIG. 1 shows a conceptual drawing of a system.

A system 100 includes elements described herein, other elements shown in the figure, and possibly other elements. In one embodiment, the system 100 includes two or more redundant nodes; however, the figure only shows one of those nodes. This one of multiple nodes is also in communication with those other nodes, with the effect of providing a reliable distributed computer system. As the multiple nodes frequently communicate the content of their memory and storage devices, the system 100 can be considered as if it were a distributed computer system with multiple real storage devices (RSD's) and a shared memory, each accessible to all processors of each individual redundant node. Accordingly, the figure should be considered to represent a distributed computer system with a shared memory and a set of shared RSD's.

Kernel Elements

The system 100 can include a kernel 110 that can include a set of kernel elements, or in addition to or in lieu thereof, a set of elements operating at a kernel level of authorization. The system 100 can also include a userspace 120, that can include a set of user elements, or in addition to or in lieu thereof, a set of elements operating at a user level of authorization (other than the kernel level of authorization).

The kernel 110 can be managed by a Linux kernel, and can include one or more real storage devices (RSD's) 111. While this application primarily describes RSD's 111 as storage devices, it is alternatively possible that they are other types of devices. For a first example, RSD's 111 could be network interface cards (NIC's), or any other suitable device, coupled to the kernel 110 using an iSCSI interface. For a second example, RSD's 111 could be another other device capable of operating as described herein.

As described herein, in one embodiment, RSD's 111 can include disk drives or other mass storage devices, such as SSD drives or otherwise, and can each be associated with a device queue 112. The device queue 112 can include instructions from a user in the userspace 120 (authorized by user access to the kernel, and sanitized by the kernel), and can include data to be written, locations of where to place data to be read, read/write instructions, responses to read/write instructions, and possibly error messages. As further described herein, the RSD's 111 and the device queues 112 can be managed by an I/O Manager (as further described herein) that provides user access to the kernel through a kernel access port 113.

The system 100 also includes at least some shared memory 110 (optionally, each individual node can include some non-shared memory). The shared memory 110 is shown in the figure as being on the border between kernelaccessable memory 120 and user-accessable memory 130, as the shared memory 110 can be accessed by either user resources or kernel resources. The distinction between user resources and kernel resources is further described herein.

Virtual Machines

The system 100 also can include one or more virtual machines (VM) 160, each including a guest operating system (guest OS) 161 and a host operating system (host OS), the latter including a set of drivers and indicated as Qemu 162. Each of the one or more guest OS's 161 can call on one or more of the drivers associated with its own copy of Qemu 162. Its Qemu 162 can include device drivers for virtual storage devices (VSD's) 170, each of which emulates a real-world storage device, although not necessarily a real-world storage device that is actually manufactured and sold.

While this application primarily describes VSD's 170 as storage devices, it is alternatively possible that they are other types of virtual devices. For a first example, VSD's 170 could be network interface cards (NIC's), or any other suitable device, coupled to its Qemu 162 using an iSCSI interface. For a second example, VSD's 170 could be another other device capable of operating as described herein.

Upon receiving an instruction to read/write, from/to, one or more VSD's 170, its Qemu 162 sends that instruction to a block driver element in the hypervisor that is managing its Qemu 162. That block driver element sends the instruction to a libscribe element 171, that performs the work of reading/writing data from/to the one or more RSD's 111 associated with those one or more VSD's 170. The libscribe element 171 is shown coupled to the RSD's 111 and their device queues 112, but in reality, the libscribe element 171 operates using a scribed daemon 180, and in particular, a libscribe server 181 within that scribed daemon 180.

"Scribed" Server

Accordingly, the libscribe element 171 sends the read/write instruction to the scribed daemon 180, an in particular, to the libscribe server 181 that can be included in the scribed daemon 180. (The scribed daemon 180 can operate using a scaled daemon 190, and in particular, a state machine 191 in the scaled daemon 190.) The libscribe server 181 sends the read/write instructions to an I/O Manager 182, which can be granted authorization to access selected portions of the kernel element 110, such as using a port 183.

The I/O Manager 182, using the port 183, can call upon the kernel element 110 to send the read/write instructions to the RSD's 111 and their device queues 112, where they can be executed and responded to. The I/O Manager 182, using the port 183, can obtain responses to the read/write instructions from the RSD's 111 and their device queues 112. The I/O Manager 182 can return those responses to the libscribe server 181, which can return them to the libscribe element 171, which can return them to the associated Qemu 162, which can return them to the associated goest OS 161.

This has the effect that the guest OS 161, which attempts to issue read/write instructions to a VSD 170, instead has those read/write instructions rewritten and redirected to one or more RSD's 111, upon which the data and metadata for that VSD 170 are stored.

Method of Operation

FIG. 2 shows a conceptual drawing of a method.

A method 200 includes flow points and method steps as described herein. These flow points and method steps are, by the nature of the written word, described in a particular order. This description does not limit the method to this particular order. They might be performed in a different order, or concurrently, or partially concurrently, or otherwise in a parallel, pipelined, quasiparallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

Beginning of Method

A flow point 200A indicates a beginning of the method. A guest OS 161, possibly prompted by an application program, intends to write to a VSD 170.

Guest OS

At a step 211, a guest OS 161 (as noted herein, possibly prompted by an application program executed using that guest OS 161), issues an instruction to write to a VSD 170.

At a step 212, the guest OS 161 designates a buffer in the shared memory, and places the data to be written within that buffer.

At a step 213, the guest OS 161 issues an instruction to the VSD 170. As the guest OS 161 is executing on a VM 160, it does not know that the instruction to the VSD 170 will not be executed directly by an RSD. Accordingly, the guest OS 161 uses the normal formatting that it would use when issuing a real instruction to an RSD. Within that real instruction, the guest OS 161 designates the buffer as the data to be written.

Hypervisor

At a step 221, the hypervisor intercepts the instruction to the VSD 170, decodes that instruction, and identifies the buffer where the data to be written has been placed. The hypervisor is able to decode the instruction because the hypervisor has control over the guest OS 161 and its operation; accordingly, the hypervisor can determine what type of instruction was issued, how that instruction is formatted, and thus the location of the data to be written.

At a step 222, the hypervisor designates an extent within the shared memory that indicates the location and size of the data to be written. This extent uniquely identifies the buffer used by the guest OS 161, and as described above, does not depend on the nature of the pointer used by the guest to refer to its buffer for transferring data. For a first example, as described herein, the extent can represent a block of memory in a shared memory. In one embodiment, the shared memory can represent a uniform undifferentiated sequence of storage blocks accessible to the hypervisor, and consequently, to the host OS. For a second example, as described herein, the hypervisor can mark the extent as "busy", to indicate not to place any new data or allocate any new memory for the guest OS 161 or its applications within that extent. Moreover, the extent can be sent to other elements within the system. As the extent designates a location and size (of the data to be written) within the shared memory, those other elements, which can also access the shared memory, can access the data to be written.

At a step 223, the hypervisor sends the extent to libscribe, an element for accessing the VSD 170. The element "libscribe" appears to the hypervisor as if it were just another device driver, that is, the device driver used in association with the VSD 170. For example, if the VSD 170 is emulating a particular type of hard disk drive, libscribe appears to the hypervisor to be a device driver for that type of disk drive. The hypervisor does not have to copy or move the data to be written. The hypervisor can simply send a short message, including the extent or otherwise identifying the extent. For example, in one embodiment, the hypervisor can communicate with libscribe using a standard interprocess communication library, such as the "boost" C++ library known for use with a Linux kernel.

The Libscribe Element

At a step 231, the libscribe element 171 can send the data to be written to a libscribe server 181. As might be indicated by the names of these elements, the libscribe element 171 can communicate with the libscribe server 181 using a client/server technique, such as one where the libscribe element 171 sends requests to the libscribe server 181, and the libscribe server 181 makes responses to the libscribe element 171. As noted above, the libscribe element 171 can communicate with the libscribe server 181 using a Unix socket communication technique, or any other technique that allows the techniques and methods described herein to be performed.

At a step 232, the libscribe server 181 can communicate with an I/O Manager 182. In one embodiment, the libscribe server 181 and the I/O Manager 182 are both operable within the scribed daemon 180, with the effect that communication between the two is relatively easy; for example, ordinary interprocess communication, or other multiprocessing techniques, can be used. In such cases, the libscribe server 181 can use the I/O Manager 182 as a device driver for one or more RSD's, including responsibility for maintaining device instruction queues, low-level failures (such as in a RAID subsystem), and otherwise. The I/O Manager 182 is responsible for exchanging data between userspace authentication and kernel-space authentication, such as by authenticating itself to the Linux kernel in command of this part of the system and obtaining authorization to read/write directly from/to its one or more associated RSD's. For example, the I/O Manager 182 can communicate with the RSD's using a linux kernel asynchronous I/O interface.

At a step 233, the RSD performs the read/write operation, and marks the extent as having been "used up". In one embodiment, this means the memory allocated to the extent can be freed, the extent can be returned to the pool of shared memory storage blocks maintained by the hypervisor, and the extent can be reassigned to use by another guest OS 161.

Responses

At a step 241, the RSD responds to the I/O Manager 182 with a result of the read/write operation, such as indicating whether the read/write operation was successful. If the read/write operation was successful, the I/O Manager 182 knows that the memory in the shared memory set of storage blocks associated with the extent can be freed. The I/O Manager 182 reports the status of the read/write operation to the libscribe server 181. In one embodiment, the phrase "reports the status" includes the possibility that the I/O Manager 182 might try again with writing to a different location on the RSD, or might try again with writing a different amount of data or writing the data to multiple locations. As used herein, the phrase "reports the status", and variants thereof, includes the possibility of collision/retry and back off (possibly exponential random back off), as sometimes used with known communication techniques. As noted above, the extent itself is passed between processes; no buffer of data need be freed.

At a step 242, the libscribe server 181 reports the status of the read/write operation to the libscribe element 171, designating the extent for which the libscribe server 181 performed its service. As noted above, the extent itself is passed between processes; no buffer of data need be freed.

At a step 243, the libscribe element 171 reports the status of the read/write operation to the hypervisor, designating the extent for which the libscribe element 171 performed its service. As noted above, the extent itself is passed between processes; no buffer of data need be freed.

End of Method

At a flow point 200B, the read/write operation is complete, and the hypervisor can free the area of shared memory defined by the extent. In one embodiment, the method 200 is repeated each time a read/write operation is instructed by a guest OS 161 (with sufficient authorization).

After reading this application, those skilled in the art would recognize that when the guest OS 161 instructs a "write" operation, data is placed in the extent and written to the RSD. Even though new data is being written, it is only the extent that is sent between elements, and the data to be written need not be copied at each call/return sequence. Similarly, those skilled in the art would recognize that when the guest OS 161 issues a "read" instruction, a writable data buffer of sufficient size is designated by the extent, and read by the RSD. Even though new data is being written, it is only the extent that is returned between elements, and the data to be read need not be copied at each call/return sequence.

Alternative Embodiments

While some embodiments are generally described herein with respect to block transfer when virtual machines are prevented access to real devices, in the context of the invention, there is no particular requirement for any such limitation. For example, individual elements or method steps of the described embodiments could be replaced with substitutes that perform similar functions in other contexts. Examples of such contexts can include any system in which information is transferred between processes (or threads) with differing security authorization.

While some embodiments are generally described herein with respect to transfer of unitary blocks of data, in the context of the invention, there is no particular requirement for any such limitation. For example, individual elements or method steps of the described embodiments could be replaced with substitutes that perform similar functions in other contexts. Examples of such contexts can include any system in which large data transfers are contemplated, such as a system that transfers a collection of multiple data packets (so long as locations of those data packets can be identified).

Elements of the system are described herein with respect to one or more possible embodiments, and are not intended to be limiting in any way. In the context of the invention, there is the particular requirement for any such limitations as described with respect to any elements of the system. For example, individual elements of the described apparatuses could be replaced with substitutes that perform similar functions. Moreover, as described herein, many individual elements of the described apparatuses are optional, and are not required for operation.

Although control elements of the one or more described apparatuses are described herein as being executed as if on a single computing device, in the context of the invention, there is no particular requirement for any such limitation. For example, the control elements of the one or more described apparatuses can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. Apparatus including
one or more guest operating systems;
one or more hypervisors, each guest operating system associated with one of said hypervisors, and each guest operating system being subject to the control of its associated hypervisor;
wherein each said hypervisor includes:
a block driver element coupled to an associated guest operating system and disposed to receive one or more instructions directed to one or more virtual storage devices, said one or more virtual storage devices associated with said guest operating system, and said one or more virtual storage devices being implemented by said hypervisor, and
an input/output (I/O) interface coupled to said block driver element and disposed to control one or more real storage devices in response to said one or more instructions; and
wherein said one or more instructions each include metadata defining a read buffer into which said I/O interface can place a block of data read from said one or more real storage devices or a write buffer into which a user process operating under control of said guest operating system can place a block of data to be written to said one or more real storage devices, such that only said metadata need be exchanged between said associated guest operating system and said one or more real storage devices to enable a read or write operation between said one or more real storage devices and said guest operating system.

2. Apparatus as in claim 1, wherein
said block driver element is accessible to said one or more associated guest operating systems;
said I/O interface is accessible to said one or more real storage devices; and
said hypervisor includes one or more elements disposed to interface between said instructions directed to said one or more virtual storage devices and instructions directed to said one or more real storage devices.

3. Apparatus as in claim 2, wherein
said instructions include read commands directed to said one or more virtual storage devices.

4. Apparatus as in claim 2, wherein
said instructions include write commands directed to said one or more virtual storage devices.

5. Apparatus as in claim 2, wherein
said one or more elements disposed to interface between said instructions directed to said one or more virtual storage devices and instructions directed to said one or more real storage devices include
a server element coupled to said block driver element and disposed to receive said one or more instructions; and
an I/O manager coupled to said server element and disposed to receive said one or more instructions.

6. Apparatus as in claim 1, wherein
said block driver element is accessible to said one or more associated guest operating systems;
said I/O interface is accessible to said one or more real storage devices; and
said hypervisor includes
a server element coupled to said block driver element and disposed to receive said instructions and said metadata, and
an I/O manager coupled to said server element and disposed to receive said instructions and said metadata.

7. Apparatus as in claim 6, wherein
said instructions include read commands directed to said one or more virtual storage devices.

8. Apparatus as in claim 6, wherein
said instructions include write commands directed to said one or more virtual storage devices.

9. Apparatus as in claim 1, wherein
said block of data defined by said metadata is accessible both with respect to said one or more virtual storage devices and said one or more real storage devices.

10. Apparatus as in claim 1, wherein
said block of data defined by said metadata is accessible both with respect to said one or more guest operating systems and said one or more real storage devices.

11. Apparatus as in claim 1, wherein
said shared memory is accessible both by said I/O interface and by a user issuing said instructions directed to one or more virtual storage devices.

12. Apparatus as in claim 1, wherein
said shared memory is accessible both by said hypervisor and by said block driver element.

13. Apparatus as in claim 1, wherein
said instructions include read or write instructions issued by a user process operating under control of said guest operating system;
wherein
read instructions reference a read buffer into which said I/O interface can place data read from a first real storage device;
write instructions reference a write buffer into which said user process can place data to be written to a second real storage device;
said read or write instructions can be performed without copying either said read buffer or said write buffer more than once after data having been placed therein.

* * * * *